Jan. 4, 1966 W. W. STRONG 3,227,992

MOUNTING DEVICE FOR TRANSISTOR SOCKET AND OTHER COMPONENTS

Filed Oct. 21, 1963

WILLIAM W. STRONG
INVENTOR

BY
BUCKHORN, BLORE, KLARQUIST & SPARKMAN
ATTORNEYS 3,227,992
Patented Jan. 4, 1966

3,227,992

MOUNTING DEVICE FOR TRANSISTOR SOCKET AND OTHER COMPONENTS

William W. Strong, Portland, Oreg., assignor to Tektronix, Inc., Beaverton, Oreg., a corporation of Oregon Filed Oct. 21, 1963, Ser. No. 317,614
9 Claims. (Cl. 339—126)

The subject matter of the present invention relates generally to mounting devices for small mechanical elements or electrical circuit components, and in particular to a socket mount assembly for fastening the socket of a transistor or vacuum tube to an apertured support panel by deformation of a resilient plastic mounting sleeve. However, the mounting device of the present invention may also be employed to secure variable capacitors, resistors or inductors and other passive electrical components as well as other active electrical devices including diodes to such support panel, and in addition can be used to attach mechanical components including other panels to the support panel.

The mount of the present invention has several advantages over previous mounting devices including those in which the transistor sockets are secured by bolts or screws to the support panel. The mount of the present invention does not employ bolts, screws or rivets to fasten the socket to the support panel, but rather uses a press fit connection between the mounting sleeve and such panel. This prevents breakage of all-plastic sockets which often occurs during or after mounting with screws. In addition, the mount of the present invention is smaller in size than conventional socket mounts which are in the form of a metal saddle which is crimped to the socket to provide screw plates extending from the opposite sides of the socket, and therefore saves mounting space on the support panel.

Another advantage of the mounting device is that it can be employed to fasten components to support panels of different thicknesses. Furthermore, the present mounts are faster and easier to apply and to remove than previous mounts. Also, the present press fit mount requires no special tools for mounting and removal but may be inserted by hand and removed by any instrument of small diameter, such as an ordinary pencil. A further advantage of the press fit mount of the present invention is that it may be molded in one piece out of any suitable resilient plastic material and is cheaper to manufacture than previous mounting devices but has adequate holding properties. In this regard, the persent mounting assembly has a removal force in a case of a transistor socket of between about 10 and 20 pounds.

It is therefore one object of the present invention to provide an improved device for mounting electrical circuit components which employs no bolts, screws or rivets but holds by reason of plastic deformation and is quick and easy to install and to remove.

Another object of the present invention is to provide an improved socket mount for the socket of a transistor or vacuum tube which prevents the breakage of such socket and which requires less mounting space.

A further object of the invention is to provide a mounting sleeve which requires no special tools for attaching it to a mounting panel by a press fit and for securing the component to be mounted to such sleeve by a snap-in fit.

An additional object of the present invention is to provide an improved socket mount of resilient plastic material which is inexpensive to manufacture and which has good holding properties.

Still another object of the present invention is to provide an improved socket mount for a transistor or tube socket which can be attached to panels of different thicknesses.

Other objects and advantages will be apparent from the following detailed description of a preferred embodiment thereof and from the attached drawings, of which:

Figure 1:
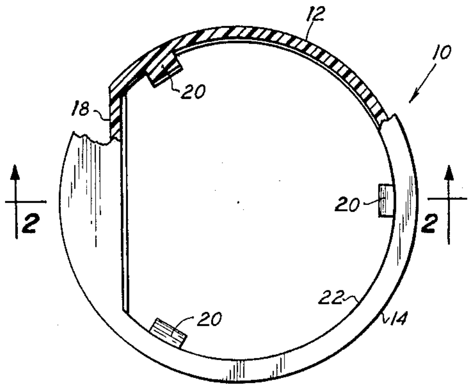
FIG. 1 is a plan view of one embodiment of the mounting device of the present invention with parts broken away for clarity.
Figure 2:
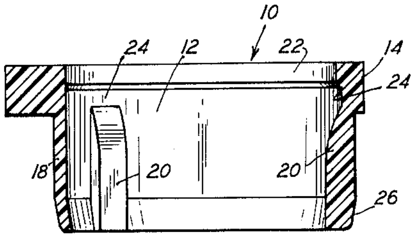
FIG. 2 is a horizontal section view taken along the line 2—2 of FIG. 1.

One embodiment of the mounting device 10 of the present invention is shown in FIGS. 1 and 2 and includes a tubular sleeve portion 12 with an annular outer flange portion 14 extending laterally outward at one end of such sleeve. The sleeve 12 may be made of a circular cylinder shape or it may be made of the semicircular D-shape shown for indexing purposes to position it with the proper orientation within a similarly shaped hole 15 which may be provided through a metal support panel 16 shown in FIG. 4. Thus, the outer flange functions as a stop to engage one side of the support panel and the sleeve 12 is provided with a flat portion 18 which orients the sleeve in the hole 15 in such panel.

Three internal ribs 20 are formed integral with the inner surface of the sleeve 12 so that they each extend longitudinally from a position spaced from the upper end of the sleeve adjacent the lower surface of the outer flange 14 to the lower end of such sleeve. Each of these ribs may be provided with a radius of about 0.1 inch at its upper end and an intermediate taper of approximately 2° with respect to the axis of the sleeve to enable easier insertion of the transistor socket or other circuit component. As shown in FIG. 1, the ribs 20 may be provided with a rectangular cross sectional area. This mounting device 10 may be molded in one piece from any suitable resilient plastic material such as nylon, polypropylene, rubber, the polycarbonate material sold by General Electric Company under the trademark Lexan or the acetal compounds sold under the trademarks Delrin and Celcon by Du Pont de Nemours & Company and the Celanese Corporation, respectively.

The mount of FIGS. 1 and 2 may also be provided with an inner flange 22 of a semi-circular configuration which extends laterally inward from the inside surface of the sleeve. The lower surface of the inner flange 22 is spaced from the upper end of the ribs 20 by a short distance which provides three detent channels 24 between such ribs and such internal flange for engagement with an outer flange on the transistor socket of FIGS. 3 and 4 to hold such socket in such mount by a snap-in fit in a manner hereafter described. The lower surface of the inner flange 22 may be tapered outward to form an angle of about 55° with the side of the sleeve to provide holding force against removal of the socket from the mount. In addition, the lower end of the socket mount may be provided with an inwardly tapering end portion 26 extending at an angle of about 10° with respect to the sleeve axis and a rounded lower edge having a radius of about 0.01 inch to enable easier insertion of the mount through the opening in the support panel 16.

Figure 3:
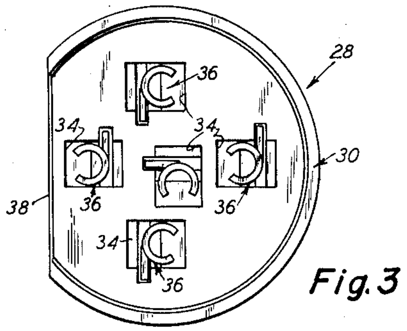
FIG. 3 is a plan view of a transistor socket made in accordance with the present invention to fit within the mounting deivce of FIGS. 1 and 2.
Figure 4:
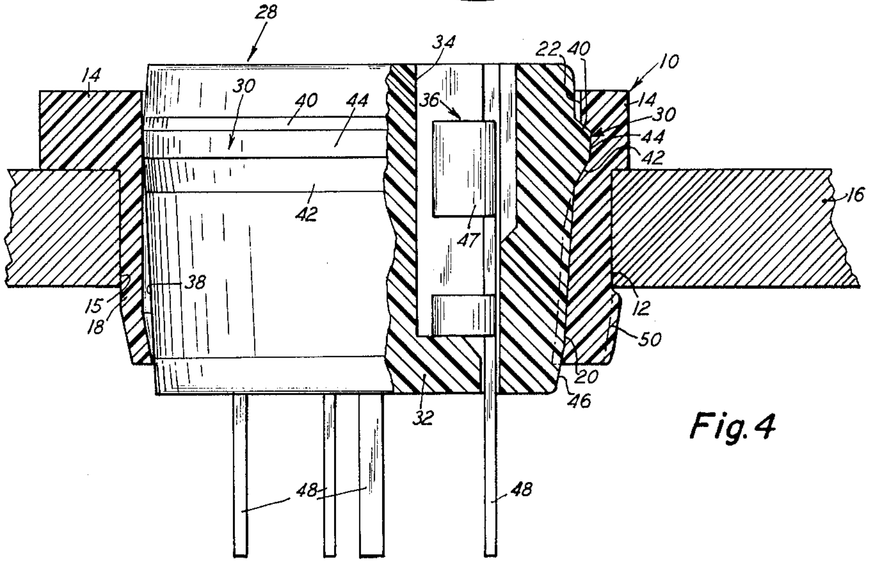
FIG. 4 is an enlarged partial section view showing the mounting device of FIGS. 1 and 2 and the socket of FIG. 3 in an assembled position, with a portion of the socket broken away to show internal structure.

As shown in FIGS. 3 and 4, a socket 28 for a transistor, vacuum tube, or other signal translating device is provided with an annular external flange 30 extending laterally outward from the outside surface of the body 32 of the socket for attachment of such socket to the panel 16 by the socket mount 10. The external flange 30 of the socket 28 is held between the lower surface of the inner flange 32 and the upper end of the ribs 20 on the socket mount. The socket 28 may be provided with five apertures 34, each containing a metal terminal member 36 which are adapted to receive the leads extending from the base of a transistor or vacuum tube in a conventional manner. The body 32 of the socket is molded on rigid plastic such as diallyl phthalate or mica-filled phenolic, and provided with a substantially flat index surface portion 38 which is shaped to conform to the inner surface of the flat portion 18 of the mount 10 to orient the socket in the mount. Thus, the socket body 28 has a substantially D-shaped cross section, as shown in FIG. 3 and the external flange 30 is of a semi-circular configuration which extends partially around the socket body and terminates at the flat surface 38. The upper surface 40 of the external flange 30 of the socket body is inclined at an angle of about 55° with respect to the axis of the socket. This angle may be varied and controls the amount of force required to remove the socket from the socket mount which is between about 10 to 20 pounds. The lower surface 42 of the external flange 30 may also be inclined with respect to the axis of the socket body, at an angle of about 25° so that such lower surface will be a relatively easy press through the internal flange of the mounting ring, yet will slope steeply enough to serve as a stop when it engages the upper end of the ribs 20 of the socket mount. The flange 30 is also provided with a side surface 44 between upper and lower surfaces 40 and 42, which tapers downwardly at an angle of about 8° with respect to the axis of the socket body in order to enable easier insertion of the external flange 30 past the inner flange 32 of the mount 10.

The bottom end of the socket body may also be provided with a tapered end portion 46 which extends inwardly at an angle of about 10° with respect to the axis of the socket body and has a rounded lower edge with a radius on the order of 0.016 inch. This pilots the socket as it is inserted into the upper end of the socket mount sleeve 12 so that it enters such sleeve quickly and easily. The substantially flat index surface 38 of the socket body may be provided with a pair of slight tapers of about 2° with respect to the axis of such body, meeting at an angle of approximately 176° and extending inwardly from a line adjacent the side surface 44 of the flange 30 to the upper and lower edges of such body. This provides the index surface 38 with a double taper to enable easier insertion of the socket. The terminal members 36 may be made of phosphor bronze or other metal with an upper pin receiving portion 47 forming an electrical contact with the pin leads on the base of the transistor or tube while the other end 48 of such member extends through the bottom of the socket body and functions as a terminal lead for connection of the lead pins of the transistor or tube to other components of the electrical circuit. Of course, these terminal members 36 would not be employed where the circuit component being mounted is a variable capacitor or other component not using a socket, in which case the component itself would be provided with an external flange, similar to flange 30 on the socket. Thus, this component would replace such socket within the sleeve 12 so that it is secured by the mount 10 directly to the panel 16.

The fastening operation of the mount and socket of the present invention includes the initial step of inserting the mount 10 through the opening 15 in the support panel 16. The holes provided in the chassis panel support plate may be circular, or may be provided with a D-shape conforming to that of the outer surface of the mount 10 in which case the mount is oriented by the index surface on the flat portion 18 of the sleeve of such mount. The diameter of this opening 15 may be slightly less than the outer diameter of the sleeve 12 of the socket mount 10 so that such socket mount is held by a slight friction fit. The mount 10 is inserted through such opening until the lower surface of the outer flange portion 14 engages one side of panel 16. Next, the socket 28 is inserted into the socket mount by placing the tapered end portion 46 at the lower end of such socket into engagement with the inner flange 22 at the top of the mount. The index surface 38 of the socket engages the inner surface of the flat portion 18 of the mount sleeve to orient such socket with respect to such mount. As the socket is inserted farther into the mount, the tapered portion 46 engages the upper end of each of the internal ribs 20 of the mounting sleeve forcing the ribs radially outward and compressing them against the edge of the panel aperture. When the tapered portion of the socket passes the lower side of the mounting panel 16 a plurality of external deformations 50 are formed in the outer surface of the sleeve 12 as shown in FIG. 4, adjacent each of the ribs 20. These deformations 50 extend laterally outward from the side of the sleeve 12 radial with to the sleeve axis and anchor the socket mount 10 to the chassis panel 16 so that such panel is held between the lower surface of the outer flange 14 and the upper end of the deformations.

As the socket is inserted still farther into the mounting sleeve the external flange 30 on such socket moves past the inner flange 22 on the mount then snaps into the detent channels 24 in engagement with the lower surface of the inner flange of the mount and the upper ends of the ribs 20. The socket is then held within the sleeve of the mount by means of its outer flange 30 with the lower rounded edge and a portion of the tapered area 46 of such socket extending out of the lower end of the sleeve. It should be noted that the thickness of the mounting panel 16 may vary between rather wide limits without affecting the fastening operation of the mounting sleeve 12 since the external deformations 50 are automatically provided at the lower surface of such mounting panel.

The ribs 20 are also spread laterally by compression between the outer surface of the socket and the edge of the hole in the mounting panel to allow the sides of the ribs to spread in the region immediately opposite the mounting panel. This enables an exact tight fit between the socket, the socket mount and panel and allows good manufacturing tolerances for these elements. Thus, the radial distance from the socket to the edge of the panel opening and the thickness of the ribs 20 determine the extent of deformation of the ribs between socket and panel. The socket mount 10 also provides a good shock mount which attenuates any vibrations which tend to be transmitted from the mounting panel to the transistor or vacuum tube inserted in the socket. The taper of the ribs 20 allows easier insertion of the socket and compensates for the taper of the socket to provide substantially the same amount of compression regardless of the thickness of the chassis panel so that the deformation 50 extends substantially the same lateral distance from the side of the sleeve.

It will be obvious to those having ordinary skill in the art that various changes may be made in the details of the above described preferred embodiment of the present invention without departing from the spirit of the invention. For example, the portion of the sleeve 12 extending between the ribs 20 can be eliminated with a resultant saving of material so that the ribs are provided as prongs extending from an interconnecting skirt. Also, external ribs may be provided on the outer surface of the sleeve in place of the internal ribs, especially when employing a rectangular sleeve. Therefore, the scope of the invention should only be determined by the following claims.

I claim:

1. A mounting member for attaching a component to a panel, comprising:

a tubular sleeve of resilient material;

a stop portion extending laterally outward from the side of said sleeve to engage one side of the panel when said sleeve is inserted into a hole through said panel;

means for securing said component to said mounting member; and a plurality of spaced projections of resilient material on said sleeve with each projection extending longitudinally along said sleeve, said projections being positioned to be forced laterally outward as said component is inserted into the sleeve to cause a plurality of external deformations on the outer surface of said mounting member, said deformations being spaced from each other about the axis of said sleeve and spaced from said stop portion in position on the opposite side of the panel from such stop portion to lock said sleeve to said panel.

2. A mounting member for attaching an electrical component to a panel, comprising:

A tubular sleeve of resilient material;

a stop portion extending laterally outward from the outside of said sleeve adjacent one end of said sleeve to engage one side of said panel when said sleeve is inserted into a hole through said panel;

securing means provided on the inside of said sleeve adajacent said stop portion for securing said component within said sleeve; and a plurality of spaced internal projections of resilient material, each projection extending longitudinally along said sleeve from a position adjacent said securing means to a position adjacent the other end of said sleeve, said projections extending laterally inward from the inner surface of said sleeve and positioned so that said projections are engaged by the component and forced laterally outward as said component is inserted into the mounting member to cause a plurality of plastic deformations on the outer surface of said mounting member which extend laterally outward adjacent each projection, said deformations being spaced from each other about the axis of said sleeve and spaced from said stop portion in position to engage the other side of the panel to lock said sleeve to said panel between said stop portion and said deformations.

3. A mounting member for attaching an electrical signal translating device socket to a panel, comprising:

a tubular sleeve of resilient plastic material;

an outer flange extending laterally outward from the side of said sleeve adjacent one end of said sleeve to engage one side of the panel when said sleeve is inserted into a hole through said panel;

detent means for securing said socket in said sleeve, including an inner flange extending laterally inward from the side of said sleeve adjacent said one end of said sleeve; and a plurality of spaced internal ribs of resilient plastic material on said sleeve, each rib extending longitudinally along the inner surface of said sleeve from a position spaced from said inner flange to a position adjacent the other end of said sleeve, said ribs projecting laterally inward from the inner surface of said sleeve a greater distance than said inner flange so that said ribs are engaged by the socket and forced laterally outward as said socket is inserted into the mounting member to cause a plurality of external plastic deformations on the outer surface of said mounting member which extend laterally outward adjacent each rib, said deformations being spaced from each other about the axis of said sleeve and spaced from said outer flange in position to engage the other side of said panel to lock said sleeve to said panel between said outer flange and said deformations.

4. A mounting member for mounting a transistor socket on an apertured panel, comprising:

a tubular sleeve of resilient plastic material having an index portion to determine the orientation of said mounting member with respect to said socket;

an outer flange extending laterally outward from the side of said sleeve adjacent one end of said sleeve for engagement with one side of the panel when said mounting member is inserted into an aperture through said panel;

an inner flange extending laterally inward from the side of said sleeve adjacent said one end of said sleeve; and a plurality of spaced internal ribs of resilient plastic material, each rib extending longitudinally along the inner surface of said sleeve from a position spaced from said inner flange adjacent the lower surface of said outer flange to a position at the other end of said sleeve, said ribs extending laterally inward from the inner surface of said sleeve a greater distance than said inner flange so that said ribs are engaged by the socket and forced laterally outward as said socket is inserted into the mounting member to cause a plurality of deformations on the outer surface of said mounting member, said deformations extending laterally outward adjacent each projection on the opposite side of said panel from said outer flange to clamp said mounting member to said panel between said outer flange and said deformations.

5. An electrical signal translating device socket and mount assembly, comprising:

a socket having terminal members adapted to receive the leads of said device;

a tubular mounting sleeve of resilient plastic material having an external flange extending laterally outward from the side of said sleeve adjacent one end of said sleeve for engagement with one side of a support panel when said sleeve is inserted into an opening in said panel; and means including a plurality of spaced longitudinal ribs on said sleeve, for securing said sleeve to said panel and for securing said socket to sleeve by the insertion of said socket into said sleeve so that said ribs are compressed between said socket and the edge of said panel opening to cause lateral spreading of said ribs into the spaces between said ribs and deformation of said sleeve past its elastic limit to produce a plurality of plastic deformations on the outer surface of said sleeve spaced about the axis of said sleeve and positioned on the opposite side of said panel from said external flange to clamp said sleeve to said panel.

6. A transistor socket and mount assembly, comprising:

a transistor socket having terminal members adapted to receive the leads of said transistor;

a tubular mounting sleeve of resilient material having an external flange extending from the side of said sleeve to engage one side of a support panel when said sleeve is inserted into an opening in said panel;

a plurality of spaced projections formed integral with said sleeve, each of said projections extending longitudinally along said sleeve from a position adjacent said external flange, said projections being positioned so that they are compressed between said socket and the edge of the panel opening to cause lateral spreading of said projections into the spaces between said projections and are forced outward to deform said sleeve past its elastic limit when said socket is inserted into said sleeve to produce a plurality of plastic deformations on the outer surface of said sleeve, said deformations being spaced from each other about the axis of said sleeve and positioned on the opposite side of said panel from said external flange to fasten said sleeve to said panel between said external flange and said deformations; and means for securing said socket to said sleeve.

7. An electrical signal translating device socket and mount assembly, comprising:

a support panel having an opening therethrough;

a socket having a plurality of terminal members adapted to receive the pin leads of said signal translating device and having an external flange extending laterally outward from the side of said socket adjacent one end of said socket;

a tubular mounting sleeve of resilient plastic material inserted in said opening of said panel and having an external flange extending laterally outward from the side of said sleeve adjacent one end of said sleeve in engagement with one side of said panel;

a plurality of spaced internal ribs formed integral with said sleeve, each of said ribs extending longitudinally along the inner surface of said sleeve from a position spaced from said one end of said sleve to a position adjacent the other end of said sleeve, said ribs extending laterally inward so that they are engaged by said socket and are forced outward to cause a plurality of plastic deformations on the outer surface of said sleeve which are spaced about the axis of said sleeve and extend outward adjacent each rib on the opposite side of said panel from said external flange of said sleeve to fasten said sleeve to said panel by clamping between said external flange and said deformations; and means for securing said socket inside said sleeve by the external flange of said socket.

8. A transistor socket and mount assembly, comprising:

a support panel having an opening therethrough;

a socket having a plurality of terminal members adapted to receive the pin leads of said transistor and having an external flange extending laterally outward from the side of said socket adjacent one end of said socket;

a tubular mounting sleeve of resilient plastic material having an outer flange extending laterally outward from the outside of said sleeve adjacent one end of said sleeve for engagement with one side of said panel when said sleeve is inserted into the opening in said panel, and an inner flange extending laterally inward from the inside of said sleeve adjacent said one end of said sleeve; and a plurality of spaced internal ribs formed integral with said sleeve, each of said ribs extending longitudinally along the inner surface of said sleeve from a position spaced from said internal flange to a position adjacent the other end of said sleeve, to provide a detent notch between said internal flange and one end of each of said ribs to hold said external flange of said socket, said ribs being of rectangular cross section and extending laterally inward so that they are engaged by said socket and forced outward when said socket is inserted into said sleeve to cause a plurality of plastic deformations on the outer surface of said sleeve which are spaced about the axis of said sleeve and extend outward adjacent each rib on the opposite side of said panel from said outer flange of said sleeve to fasten said sleeve to said panel by clamping between said outer flange and said deformations.

9. A mounting member for attaching an electrical component to a panel, comprising:

a tubular sleeve of plastic material;

a stop portion extending laterally outward from the sleeve adjacent one end of said sleeve to engage one side of said panel when said sleeve is inserted into a hole through said panel;

securing means provided on the inside of said sleeve for securing said component within said sleeve; and at least one rib of plastic material extending longitudinally along said sleeve from a position adjacent said stop portion to a position adjacent the other end of said sleeve so that said rib is compressed between the component and the panel to cause lateral spreading of the rib and deformation of the mounting member beyond its elastic limit as said component is inserted into the mounting member positioned within the hole in said panel to cause a plastic deformation on the outer surface of said mounting member, at least a portion of said deformation extending beyond the periphery of said hole on the opposite side of said panel from said stop portion, said deformation being spaced longitudinally from said stop portion in position to engage the other side of the panel to lock said sleeve to said panel between said stop portion and said deformation.

References Cited by the Examiner

UNITED STATES PATENTS

| | | | |
|---|---|---|---|
| 2,456,572 | 12/1948 | Wagstaff | 339—129 X |
| 2,872,655 | 2/1959 | Damon | 339—126 X |
| 2,882,514 | 4/1959 | Krantz | 339—17 X |
| 2,914,276 | 11/1959 | Antalek et al. | |
| 3,011,743 | 12/1961 | Heath | 248—56 X |
| 3,065,004 | 11/1962 | Laich | 16—2 X |
| 3,142,526 | 7/1964 | Edwards | 339—126 |

JOSEPH D. SEERS, *Primary Examiner.*